May 1, 1951 A. SILVERBERG 2,551,399
PROCESS FOR THE PURIFICATION OF CARBON DIOXIDE
Filed Dec. 3, 1945
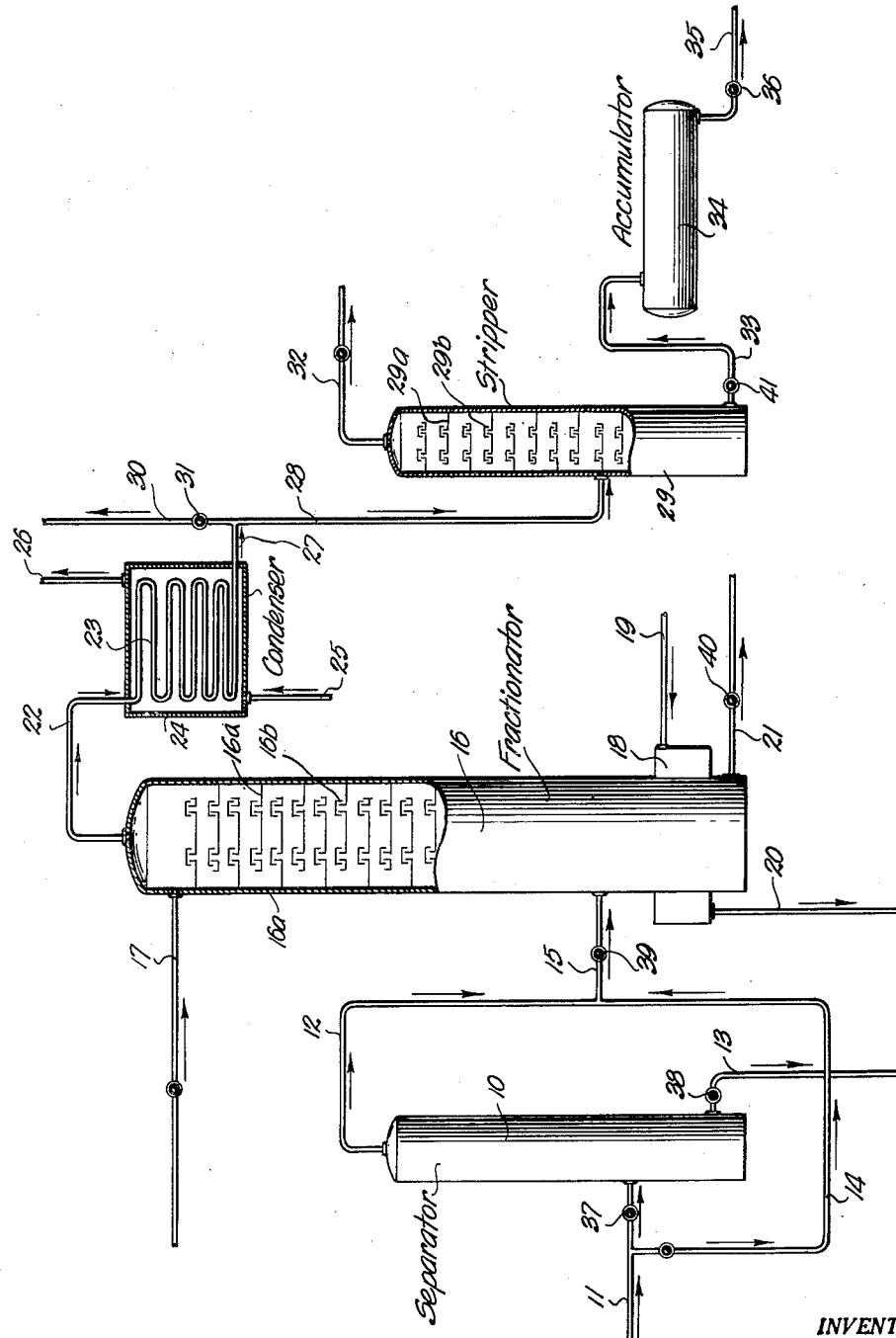
INVENTOR.
Abe Silverberg
BY
ATTORNEY.

Patented May 1, 1951

2,551,399

UNITED STATES PATENT OFFICE 2,551,399

PROCESS FOR THE PURIFICATION OF CARBON DIOXIDE

Abe Silverberg, St. Louis, Mo.

Application December 3, 1945, Serial No. 632,536

2 Claims. (Cl. 62—175.5)

This invention relates to improvements in a process for the purification of carbon dioxide and refers more particularly to the removal of impurities from carbon dioxide gas used for the production of liquid or solid carbon dioxide commercially designated as Dry Ice.

Carbon dioxide as recovered from gas wells has almost inevitably associated therewith a small proportion or content of objectionable hydrocarbons such as methane, ethane, propane, butane, pentane, and others which are difficult and expensive to remove. Carbon dioxide gases obtained from other sources such as the combustion of fuels, brewery and distillery by-products and calcining operations may also be purified by this process. Although the basic principles employed in the process hereinafter described may be used for the removal, extraction and separation of many different types of impurities the removal of hydrocarbon impurities will be explained since they are among the objectionable materials most commonly found in the gas and most difficult to take out.

Methods used heretofore for the purification of carbon dioxide containing hydrocarbons consist primarily in the passing of the gas to be purified through scrubbers or towers containing chemicals, adsorbents, absorbents or a combination of such materials having a selective affinity for the hydrocarbon. Among the absorbents used is activated carbon. Such absorbents seldom remove all trace of the objectionable impurities and the resultant gas usually contains a slight hydrocarbon odor making it unsuitable for the commercial production of Dry Ice. Furthermore, chemical purification processes are expensive not only in initial cost but require the use and replacement of large quantities of treating materials. The equipment for reactivation of the absorbents or chemicals used is another factor that makes for objectionable expense. Since the purifying chemicals or absorbents cannot be indefinitely reactivated they must from time to time be renewed to render satisfactory results. These requirements all tend to make the extraction of impurities by such methods uneconomical at the prices offered for the product on the commercial market.

Among the objects of the invention, therefore, is to provide a process by which exceedingly small quantities of impurities are removed from carbon dioxide to produce a substantially analytically pure product.

Another object is to provide a relatively simple method whose original capital cost for equipment is the largest expense and since treating materials are dispensed with this capital cost is inconsequential when applied to the large quantity of product recovered.

A further object is to provide a process depending principally upon pressure and temperature differential maintained in the successive steps whereby impurities are separated by boiling point differences at the temperatures existing.

Other and further objects will appear from the following description.

In the single figure which accompanies the specification and is to be read in conjunction therewith and in which like reference numerals indicate like parts, an apparatus is shown in which the process of the invention may be practiced.

At 10 is a separator into which is connected a feed pipe 11, an overhead discharge pipe 12 and a liquid withdrawal line 13. A bypass line 14 connects the feed line 11 with transfer line 15 by which both the bypass and overhead line 12 communicate with a fractionator 16. The fractionator is a vertical tower having a plurality of bubble trays diagrammatically indicated at 16a and liquid downcomer pipes diagrammatically shown at 16b. A pipe 17 connected into the top of the tower is for the introduction of liquid carbon dioxide used as a reflux in the tower. In the bottom of the tower is a reboiler or heating element diagrammatically shown at 18. Suitable heating fluid is supplied to the heating element through pipe 19 and discharged therefrom through pipe 20. A liquid discharge line 21 connected into the bottom of the tower serves to withdraw separated liquid. Into the top of the tower is connected an overhead line 22 through which uncondensed material passes from the tower to condenser coil 23 positioned in condenser box 24. Cooling fluid is introduced to the condenser box through pipe 25 and is discharged therefrom through pipe 26. Fluids discharged from coil 23 pass out through pipe 27 and line 28 to a stripping tower 29. The interior of the stripper is similar in construction to the fractionator with bubble trays at intervals, diagrammatically shown at 29a. These trays effect intimate contact between the vapors and liquids which pass counterflow through the stripper. Downcomer pipes 29b transfer the liquid successively from the top to the bottom trays of the tower. A vent line 30 controlled by valve 31 is connected into the junction of pipes 27 and 28 permitting fluids therein to be purged of noncondensible gases. The stripper has an overhead pipe 32 and a liquid withdrawal pipe 33. The latter connects the stripping tower with an accumulator 34. From the accumulator purified liquid carbon dioxide is withdrawn through pipe 35 regulated by valve 36. Control valves are conveniently located in the transfer pipes throughout the system to control the operation.

In order to determine operating conditions to be maintained in the separate steps of the process it is first necessary to analyze the gas and then choose the proper set of conditions of pressure and temperature to obtain the desired degree of separation. Since, with the exception of subcooling, the pressure determines the temperature at which carbon dioxide is liquified the pressures and temperatures should be chosen not only to obtain efficient conditions for separation of impurities, but also for economical operation. Since low temperatures require greater condensing capacity the highest economical temperatures and pressures should be used which will give proper separation of the gaseous ingredients.

As a typical example of a crude gas to be purified there has been selected a gaseous mixture containing

| | Per cent |
|---|---|
| Carbon dioxide | 95.0 |
| Methane | 2.5 |
| Ethane | 1.5 |
| Propane | 0.5 |
| Butane Plus | 0.5 |

Although the above mixture is arbitrarily chosen, it resembles a mixture difficult of separation and one which can be efficiently purified in the instant process. Furthermore, it should be understood that the hydrocarbon constituents may be present in innumerable combinations and amounts according to the source of the crude gas and that the example selected is merely typical of many.

To purify this mixture and assuming an initial line pressure of 1,000 pounds to 1,200 pounds per square inch pressure, at expansion valve 37 the pressure is reduced by substantially one-half or to 550 pounds per square inch which will automatically drop the temperature by expansion of the gas to approximately 40° F. At this temperature the heavier hydrocarbons plus a large part of the moisture contained in the crude gas charge will condense and may be drawn off continuously or intermittently from the bottom of the tower through pipe 13, by valve 38. The uncondensed materials pass off from the top of the tower through overhead line 12 and are discharged into the fractionator 16 through transfer line 15. At expansion valve 39 in the transfer line the pressure is reduced again by about one-half or approximately 250 pounds per square inch which is the pressure maintained in the fractionator. Again the temperature will drop with the expansion of the gas to approximately minus 11° F.

In the fractionator the gases and liquids are passed counterflow to each other through conventional bubble-type tower construction built into the fractionator. To further concentrate the impurities and redistill the liquid carbon dioxide gas accumulated in the bottom of the tower, liquid carbon dioxide is introduced as a refluxing medium through pipe 17 and heat is supplied to the reboiler 18. Sufficient liquid carbon dioxide is added as reflux to the top of the tower and at low enough temperatures to insure arrival of some of the reflux at the bottom of the tower. The bottom of the tower is heated by a steam jacket or coils sufficiently to reboil the liquids producing thereby greater activity of the tower components resulting in a more effective concentration of the impurities. The fractionator liquid accumulated at the bottom is withdrawn either continuously or intermittently through pipe 21 by manipulation of valve 40. At the operating conditions of the fractionator, normally maintained at approximately 250 pounds per square inch and minus 11° F. the bottom drawoff will contain liquid carbon dioxide as the carrying medium and hydrocarbons of the order of butanes plus, enumerated in the tabulation above. The overhead product will contain carbon dioxide, methane, ethane and propane. This uncondensed gaseous mixture is cooled in condenser coil 23, where temperatures of the fluids are reduced by circulation of a cooling medium around the coils. Preferably, the condenser will operate at temperatures sufficiently low to condense the carbon dioxide. The bleeder or vent connection 30 controlled by valve 31 permits the removal of uncondensed gases or purging of the condenser of gases unliquified therein.

After leaving the condenser the liquid carbon dioxide passes through pipes 27 and 28 to stripper 29 where the liquid is further denuded of light uncondensed hydrocarbons, such as methane, ethane and propane, that remain after purging of the condenser. Pressures on the condenser and stripper are maintained slightly less than upon the fractionator.

Pure liquid carbon dioxide is removed from the bottom of the stripper through pipe 33 controlled by valve 41. Through this pipe it is directed to accumulator 34 from which it is withdrawn through pipe 35, by manipulation of valve 36, and passed to an ice press, not shown, for the production of carbon dioxide.

An alternate method based upon the same principles as that used in the apparatus shown would be one in which the gas passed overhead from the fractionator is directed to a second fractionator of similar design and construction. In the second fractionator sufficient reflux of liquid carbon dioxide is used to condense the entire carbon dioxide content of the tower. The temperature, however, would not be low enough to condense other impurities. The overhead from the second fractionator would under these circumstances contain the noncondensibles including methane, ethane and propane and the bottom drawoff from the second fractionator would constitute pure carbon dioxide liquid. In the alternate type of operation the liquid carbon dioxide in the bottom from the second fractionator would pass directly to the accumulator instead of through the condenser and stripper shown in the drawing.

Although an operating pressure of approximately 250 pounds per square inch and temperatures of the order of minus 11° F. are used in the fractionator it is contemplated that these temperatures and pressures may be altered to obtain the desired degree of separation and purification depending upon the analysis of the charging gas and the character of the separation desired. For example, by operating the first fractionator of the two-tower alternate method at somewhat higher temperatures and pressures butane, methane, ethane and propane can be removed from the first tower leaving pentane plus as the principal withdrawal material from the bottom of the first fractionator. The second tower would then produce pure liquid carbon dioxide as a bottom product and methane, ethane, propane and butane would all be discharged over head. This mixture of hydrocarbons can be further separated if desired and by-product hydrocarbons recovered.

As an explanation of why the operating pressure of 250 pounds per square inch has been chosen for the preferred pressure in the fractionator the following table enumerates approximate boiling points of the ingredients at atmospheric pressure.

| Compound: | Approx. B. P. °F. |
|---|---|
| Methane | −233 |
| Ethane | −119 |
| Propane | −36 |
| Carbon dioxide | −11 |
| Butane | +34 |
| Pentane | +98 |

If the line pressure is below 550 pounds per square inch but above 250 pounds per square inch the separator is omitted and the pressure reduced to 250 pounds upon entering the fractionator. If the line pressure is below 250 pounds the gas should be compressed up to the required 250 pounds for proper operation of the fractionator. In every case it is preferable that the gas is liquified at the pressure which gives the corresponding correct temperature for separation of impurities.

It will be seen from the above that a variety of temperatures and pressures may be used with the same efficient results without varying from the basic principles of the purification process. The operation described in the example is, however, the preferred method as it is the most economical for the purification of the gas selected. In other words, the use of 250 pounds and minus 11° F. is preferred instead of a pressure of 200 pounds in the fractionator and minus 25° F. for example outlined above.

It is to be understood that the apparatus will be heavily insulated to prevent refrigeration and heat loss from the exposed surfaces of the vessels and connecting pipes. If the carbon dioxide content of the gaseous mixture is low and it is desired to recover both the carbon dioxide and other constituents the same system utilizing fractional condensation and distillation using liquid carbon dioxide as the reflux medium for temperature control may be used.

From the foregoing it will be seen that the invention is well adapted to attain all of the ends and objects hereinabove set forth together with other advantages which are obvious and which are inherent to the process.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A process for treating crude carbon dioxide containing a small amount of non-condensible gas and impurities having boiling points above and below carbon dioxide and supplied at an elevated pressure capable of liquefying carbon dioxide when the temperature is reduced sufficiently below the condensing point of carbon dioxide at the pressure used to produce a substantially pure liquid carbon dioxide substantially free from said impurities comprising the steps of supplying to a separator said crude carbon dioxide under an elevated pressure capable of liquefying said carbon dioxide when the temperature is lowered below the corresponding liquefaction point, reducing the pressure of the crude carbon dioxide entering the separator sufficiently to condense impurities having higher boiling points than carbon dioxide whereby partial purification is effected, passing the partially purified carbon dioxide to a fractionator and there further reducing the pressure and liquefying additional impurities therefrom having higher boiling points than carbon dioxide, removing the condensed impurities from the separator and fractionator to effect further purification of the carbon dioxide, passing the further purified carbon dioxide uncondensed in the fractionating zone to a condensing zone, reducing its temperature sufficiently to liquefy carbon dioxide therefrom, passing the liquefied carbon dioxide to a stripping zone, and separating non-condensibles to complete the purification of the liquefied carbon dioxide as a main product.

2. A process for treating crude carbon dioxide containing a small amount of non-condensible gas and impurities having boiling points above and below carbon dioxide and supplied at an elevated pressure capable of liquefying carbon dioxide when the temperature is reduced sufficiently below the condensing point of carbon dioxide at the pressure used to produce a substantially pure liquid carbon dioxide substantially free from said impurities comprising the steps of supplying to a separator said crude carbon dioxide under an elevated pressure capable of liquefying said carbon dioxide when the temperature is lowered below the corresponding liquefaction point, reducing the pressure upon said crude carbon dioxide entering the separator and removing from the separating zone condensed impurities having higher boiling points formed therein as a result of said pressure reduction, transferring the partially purified carbon dioxide from the separating zone to a fractionator, further reducing the pressure upon said carbon dioxide entering the fractionating column, introducing liquid carbon dioxide into the fractionator as a reflux at a sufficiently low temperature to insure arrival of liquid carbon dioxide containing impurities at the bottom of the column, heating the liquid at the bottom of the column sufficiently to reboil the same, transferring uncondensed and partially purified carbon dioxide and remaining impurities from the fractionating column to a condensing zone, and reducing its temperature sufficiently to liquefy carbon dioxide but insufficiently to liquefy remaining impurities, and recovering the purified liquid carbon dioxide as the main product.

ABE SILVERBERG.

REFERENCES CITED

The following references are of record in the file of this patent:

UNITED STATES PATENTS

| Number | Name | Date |
|---|---|---|
| 1,946,580 | Gregory | Feb. 13, 1934 |
| 1,958,554 | Van Nuys | May 15, 1934 |
| 2,180,200 | De Baufre | Nov. 14, 1939 |
| 2,287,137 | Ross | June 23, 1942 |
| 2,302,262 | Schiller | Nov. 17, 1942 |
| 2,327,643 | Houghland | Aug. 24, 1943 |

OTHER REFERENCES

Elements of Frictional Distillation, by Robinson and Gilliland, third edition, published by McGraw-Hill Book Company, Inc., pages 244, 245 and 248.

Handbook Butane-Propane Gases, third edition, published by Western Business Paper, Incorporated, see Figure 4, page 45.